(12) United States Patent
Udo et al.

(10) Patent No.: US 11,316,398 B2
(45) Date of Patent: Apr. 26, 2022

(54) TERMINAL DEVICE FOR ROTARY ELECTRIC MACHINE AND METHOD FOR MANUFACTURING SAME

(71) Applicant: Mitsubishi Electric Corporation, Tokyo (JP)

(72) Inventors: Toyoaki Udo, Tokyo (JP); Zhishuai Gao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 295 days.

(21) Appl. No.: 16/489,171

(22) PCT Filed: Mar. 30, 2017

(86) PCT No.: PCT/JP2017/013293
§ 371 (c)(1),
(2) Date: Aug. 27, 2019

(87) PCT Pub. No.: WO2018/179242
PCT Pub. Date: Oct. 4, 2018

(65) Prior Publication Data
US 2020/0014269 A1 Jan. 9, 2020

(51) Int. Cl.
*H02K 3/50* (2006.01)
*H02K 15/00* (2006.01)

(52) U.S. Cl.
CPC ............ *H02K 3/50* (2013.01); *H02K 15/0062* (2013.01)

(58) Field of Classification Search
CPC ........... H02K 15/0062; H02K 15/0068; H02K 2203/06
See application file for complete search history.

(56) References Cited

U.S. PATENT DOCUMENTS

2014/0028130 A1   1/2014  Sonoda et al.
2014/0183993 A1*  7/2014  Takasaki ............ H02K 15/0062
                                                    310/71
2019/0173216 A1*  6/2019  Sunaga .................... H01R 4/26

FOREIGN PATENT DOCUMENTS

JP    2001-095201 A    4/2001
JP    2004-120905 A    4/2004
(Continued)

OTHER PUBLICATIONS

Communication dated Feb. 21, 2020 by the European Patent Office in application No. 17903203.2.
(Continued)

*Primary Examiner* — Quyen P Leung
*Assistant Examiner* — Minki Chang
(74) *Attorney, Agent, or Firm* — Sughrue Mion, PLLC; Richard C. Turner

(57) ABSTRACT

Provided is a terminal device for a rotary electric machine, in which a plurality of conductive members, each having a first connecting portion having a flat plate shape, are provided to a base made of an insulating material. Each of a plurality of connection terminals has a second connecting portion having a flat plate shape. The second connecting portion is connected to a corresponding one of the first connecting portions. After a processed connecting portion being at least any one of the first connecting portion and the second connecting portion is formed through press-working performed for a conductive flat plate, compression processing is performed for a front surface and a back surface at both ends of the processed connecting portion in a width direction of the processed connecting portion.

7 Claims, 4 Drawing Sheets

(56) References Cited

FOREIGN PATENT DOCUMENTS

JP      5320431 B2   10/2013
JP   2015-173544 A   10/2015

OTHER PUBLICATIONS

International Search Report for PCT/JP2017/013293 dated, May 30, 2017.

* cited by examiner

TERMINAL DEVICE FOR ROTARY ELECTRIC MACHINE AND METHOD FOR MANUFACTURING SAME

CROSS REFERENCE TO RELATED APPLICATIONS

This application is a National Stage of International Application No. PCT/JP2017/013293 filed Mar. 30, 2017.

TECHNICAL FIELD

The present invention relates to a terminal device to be provided in a rotary electric machine such as a motor and a method of manufacturing the same.

BACKGROUND ART

In a related-art rotary electric machine, to each stator coil terminal, a corresponding terminal is connected. Each of the terminals has a rising portion. A plurality of feeding terminals are held in a base. Each of the feeding terminals is connected to a corresponding one of the rising portions through welding, fusing, or soldering (see, for example, Patent Literature 1).

CITATION LIST

Patent Literature

[PTL 1] JP 5320431 B2

SUMMARY OF INVENTION

Technical Problem

In general, components such as the terminals and the feeding terminals are manufactured by press-working. In the press-working, burr is formed at a processed portion. Thus, in the related-art rotary electric machine described above, when the feeding terminals are connected to the rising portions, attention is required so as to join surfaces, each without the burr projecting therefrom. Specifically, effort and time are required to check a front side and a back side of each of the components.

The present invention has been made to solve the problems described above, and has an object to provide a terminal device for a rotary electric machine and a method of manufacturing the same, with which connection terminals can be connected to conductive members without need for checking a front side and a back side of each of the connection terminals to improve manufacturing efficiency.

Solution to Problem

A terminal device for a rotary electric machine according to one embodiment of the present invention includes: a base made of an insulating material; a plurality of conductive members, which are provided to the base, and each have a first connecting portion having a flat plate shape; and a plurality of connection terminals, each having a second connecting portion having a flat plate shape, the second connecting portion to be connected to a corresponding one of the first connecting portions, wherein each of the first connecting portion and the second connecting portion has a connecting-portion front surface and a connecting-portion back surface being positioned on a back side of the connecting-portion front surface, wherein any one of the connecting-portion front surface and the connecting-portion back surface of each of the second connecting portions is selectively brought into full contact with a corresponding one of the first connecting portions, and wherein the connecting-portion front surface and the connecting-portion back surface of a processed connecting portion being at least any one of the first connecting portion and the second connecting portion gradually approach each other as extending outward in a width direction of the processed connecting portion at both ends of the processed connecting portion in the width direction of the processed connecting portion.

A method of manufacturing a terminal device for a rotary electric machine, the terminal device including: a base made of an insulating material; a plurality of conductive members, which are provided to the base, and each have a first connecting portion having a flat plate shape; and a plurality of connection terminals, each having a second connecting portion having a flat plate shape, the second connecting portion to be connected to a corresponding one of the first connecting portions, the method comprising: forming a processed connecting portion being at least any one of the first connecting portion and the second connecting portion through press-working for a conductive flat plate; and performing compression processing for a front surface and a back surface of the processed connecting portion at both ends of the processed connecting portion in a width direction of the processed connecting portion.

Advantageous Effects of Invention

With the terminal device for a rotary electric machine of the present invention, connection terminals can be connected to conductive members without need for checking a front side and a back side of each of the connection terminals, thereby being capable of improving manufacturing efficiency.

DESCRIPTION OF EMBODIMENT

Now, embodiments of the present invention are described with reference to the drawings.

First Embodiment

Figure 1:
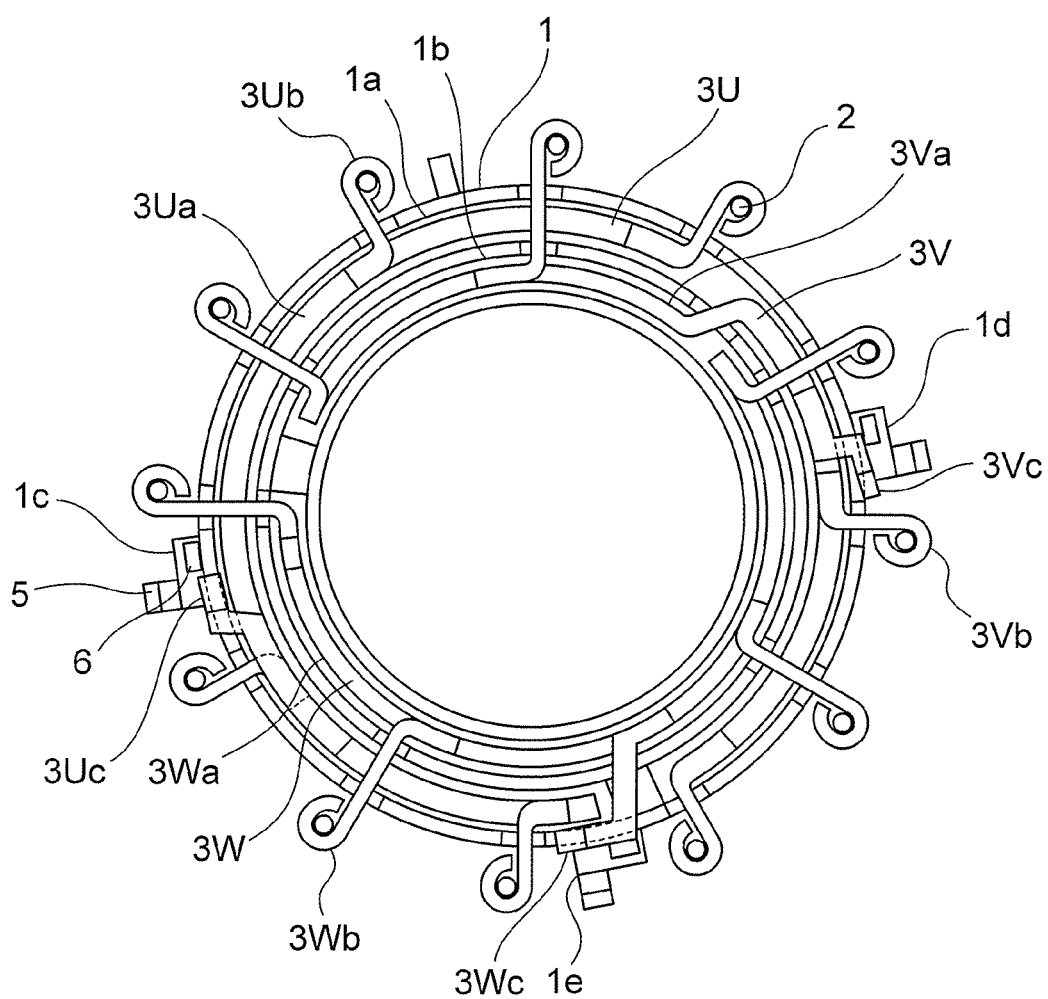
FIG. 1 is a plan view for illustrating a terminal device for a motor according to a first embodiment of the present invention.
Figure 2:
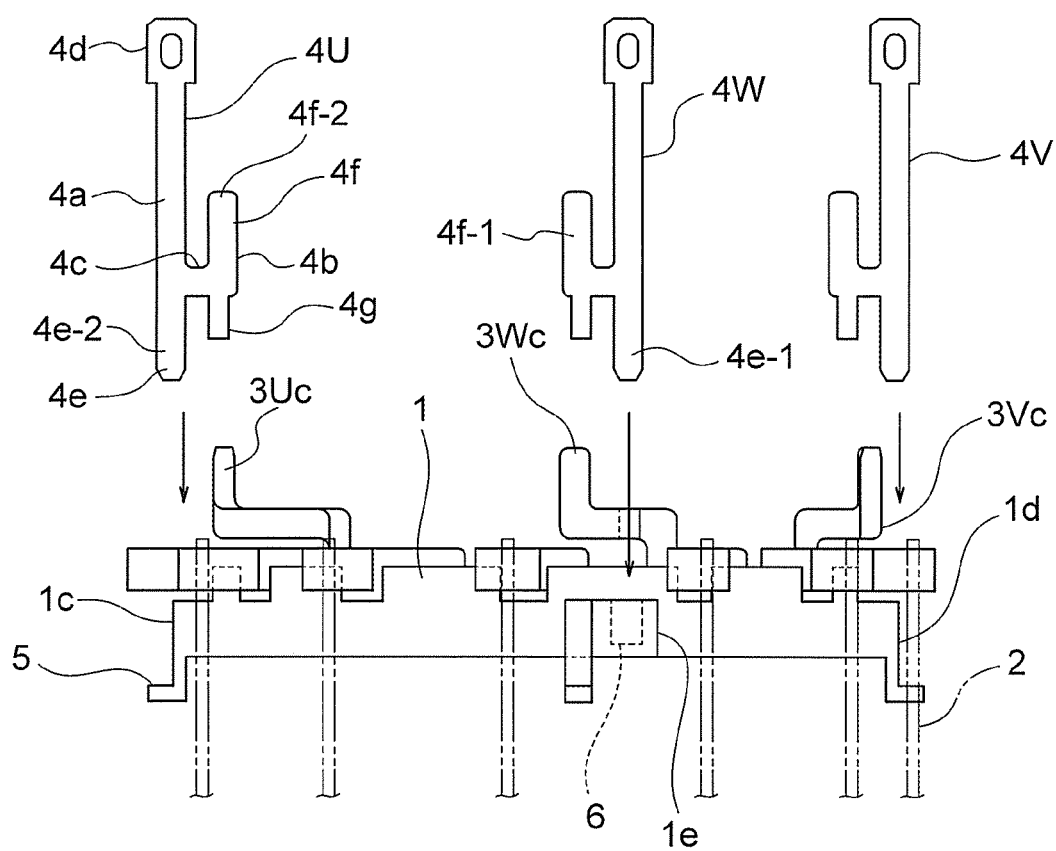
FIG. 2 is a side view for illustrating the terminal device of FIG. 1.

FIG. 1 is a plan view for illustrating a terminal device for a motor according to a first embodiment of the present invention. FIG. 2 is a side view for illustrating the terminal device of FIG. 1. In FIG. 1 and FIG. 2, a base 1, which is made of an insulating resin and has an annular shape, is fixed to an axial end of a stator (not shown). Annular grooves arranged in two rows, specifically, an outer groove 1a and an inner groove 1b are formed on a surface of the base 1, which is on the side opposite to the stator.

A first connection-terminal support portion 1c, a second connection-terminal support portion 1d, and a third connection-terminal support portion 1e are provided at three positions on an outer periphery of the base 1. The first connection-terminal support portion 1c, the second connection-terminal support portion 1d, and the third connection-terminal support portion 1e are arranged at intervals in a circumferential direction of the base 1.

On a radially outer side of the base 1, a plurality of (twelve in this example) coil conductor end portions 2 drawn out from a plurality of stator windings (not shown) are arranged at intervals in the circumferential direction of the base 1. The coil conductor end portions 2 are connected in, for example, a Y-connection configuration or a Δ-connection configuration through intermediation of the terminal device.

A U-phase conductive plate 3U, a V-phase conductive plate 3V, and a W-phase conductive plate 3W, each being a plate-shaped conductive member, are inserted into the outer groove 1a and the inner groove 1b.

The U-phase conductive plate 3U includes a U-phase conductive plate main body 3Ua, a plurality of (four in this example) U-phase arm portions 3Ub, and a U-phase conductive plate-side connecting portion 3Uc. The U-phase conductive plate main body 3Ua is arranged in the outer groove 1a. Each of the U-phase arm portions 3Ub is arranged between a corresponding one of the coil conductive end portions 2 and the U-phase conductive plate main body 3Ua. The U-phase conductive plate-side connecting portion 3Uc, which serves as a first connecting portion, has a rectangular flat plate shape and is arranged in the vicinity of the first connection-terminal support portion 1c.

Each of the U-phase arm portions 3Ub projects from the outer groove 1a in an axial direction of the base 1 and also projects outward in a radial direction of the base 1. Further, a distal end of each of the U-phase arm portions 3Ub encloses the corresponding one of the coil conductive end portions 2 and is connected to the corresponding one of the coil conductive end portions 2 through fusing or welding.

The V-phase conductive plate 3V includes a V-phase conductive plate main body 3Va, a plurality of (four in this example) V-phase arm portions 3Vb, and a V-phase conductive plate-side connecting portion 3Vc. The V-phase conductive plate main body 3Va is arranged over the outer groove 1a and the inner groove 1b. Each of the V-phase arm portions 3Vb is arranged between a corresponding one of the coil conductive end portions 2 and the V-phase conductive plate main body 3Va. The V-phase conductive plate-side connecting portion 3Vc, which serves as a first connecting portion, has a rectangular flat plate shape and is arranged in the vicinity of the second connection-terminal support portion 1d.

Each of the V-phase arm portions 3Vb projects from the outer groove 1a in an axial direction of the base 1 and also projects outward in a radial direction of the base 1. Further, a distal end of each of the V-phase arm portions 3Vb encloses the corresponding one of the coil conductive end portions 2 and is connected to the corresponding one of the coil conductive end portions 2 through fusing or welding.

The W-phase conductive plate 3W includes a W-phase conductive plate main body 3Wa, a plurality of (four in this example) W-phase arm portions 3Wb, and a W-phase conductive plate-side connecting portion 3Wc. The W-phase conductive plate main body 3Wa is arranged in the inner groove 1b. Each of the W-phase arm portions 3Wb is arranged between a corresponding one of the coil conductive end portions 2 and the W-phase conductive plate main body 3Wa. The W-phase conductive plate-side connecting portion 3Wc, which serves as a first connecting portion, has a rectangular flat plate shape and is arranged in the vicinity of the third connection-terminal support portion 1e.

Each of the W-phase arm portions 3Wb projects from the outer groove 1a in an axial direction of the base 1 and also projects outward in a radial direction of the base 1. Further, a distal end of each of the W-phase arm portions 3Wb encloses the corresponding one of the coil conductive end portions 2 and is connected to the corresponding one of the coil conductive end portions 2 through fusing or welding.

A U-phase connection terminal 4U, a V-phase connection terminal 4V, and a W-phase connection terminal 4W (none of those is shown in FIG. 1) are supported in the first connection-terminal support portion 1c, the second connection-terminal support portion 1d, and the third connection-terminal support portion 1e, respectively. In FIG. 2, the U-phase connection terminal 4U, the V-phase connection terminal 4V, and the W-phase connection terminal 4W are illustrated as being separated from the base 1.

Each of the U-phase connection terminal 4U, the V-phase connection terminal 4V, and the W-phase connection terminal 4W is formed of a common component. Specifically, each of the U-phase connection terminal 4U, the V-phase connection terminal 4V, and the W-phase connection terminal 4W is a component having the same shape, which is made of the same material.

Each of the connection terminals 4U, 4V, and 4W is a component having a flat plate shape, and has a first straight portion 4a, a second straight portion 4b, and a bridge portion 4c. The second straight portion 4b is parallel to the first straight portion 4a. The bridge portion 4c is formed between the first straight portion 4a and the second straight portion 4b. A length of the second straight portion 4b is shorter than a length of the first straight portion 4a.

A current supply portion 4d, to which a current is supplied, is formed at an end of the first straight portion 4a, which is on the side opposite to the base 1. A positioning insertion portion 4e is formed at an end of the first straight portion 4a, which is on the side closer to the base 1.

A terminal-side connecting portion 4f having a rectangular flat plate shape, which serves as a second connecting portion, is formed at an end of the second straight portion 4b, which is on the side opposite to the base 1. An abutment portion 4g is formed at an end of the second straight portion 4b, which is on the side closer to the base 1.

The terminal-side connecting portion 4f is not formed on the first straight portion 4a with the current supply portion 4d and is arranged at a position offset from the first straight portion 4a. Specifically, the terminal-side connecting portion 4f is nonlinearly continuous with the current supply portion 4d through the bridge portion 4c therebetween.

Each of the connection-terminal support portions 1c, 1d, and 1e has a leg portion 5 and a hole 6. The leg portion 5 is configured to support the base 1 itself. The positioning insertion portion 4e is inserted into the hole 6.

Each of the positioning insertion portions 4e is inserted into a corresponding one of the holes 6 until the abutment portion 4g is brought into abutment against an upper surface of a corresponding one of the connection-terminal support portions 1c, 1d, and 1e. In this manner, each of the connection terminals 4U, 4V, and 4W is arranged at an appropriate position in a corresponding one of the connection-terminal support portions 1c, 1d, and 1e.

A width dimension of the hole 6 in a thickness direction of the positioning insertion portion 4e is equal to a thickness dimension of the positioning insertion portion 4e. With the above-mentioned width dimensions, the positioning insertion portion 4e is inserted into the hole 6 in a press-fitted state.

As a result of the appropriate insertion of the positioning insertion portion 4e into the hole 6, the terminal-side connecting portion 4f is placed so as to be brought into full contact with a corresponding one of the conductive plate-side connecting portions 3Uc, 3Vc, and 3Wc. Under this state, the terminal-side connecting portion 4f is connected to the corresponding one of the conductive plate-side connecting portions 3Uc, 3Vc, and 3Wc through welding or soldering so as to be mechanically and electrically connected thereto.

The connection terminals 4U, 4V, and 4W are formed as members independent of the conductive plates 3U, 3V, and 3W so as to improve a yield of the material.

In FIG. 2, the U-phase connection terminal 4U is illustrated with the right and the left reversed to those of the V-phase connection terminal 4V and the W-phase connection terminal 4W. The terminal-side connecting portion 4f has a connecting-portion front surface 4f-1 and a connecting-portion back surface 4f-2 located on a back side of the connecting-portion front surface 4f-1. The connecting-portion front surface 4f-1 is one end surface of the terminal-side connecting portion 4f in a thickness direction of the terminal-side connecting portion 4f, whereas the connecting-portion back surface 4f-2 is another end surface of the terminal-side connecting portion 4f in the thickness direction of the terminal-side connecting portion 4f.

The positioning insertion portion 4e has an insertion-portion front surface 4e-1 and an insertion-portion back surface 4e-2 located on a back side of the insertion-portion front surface 4e-1. The insertion-portion front surface 4e-1 is one end surface of the positioning insertion portion 4e in a thickness direction of the positioning insertion portion 4e, whereas the insertion-portion back surface 4e-2 is another end surface of the positioning insertion portion 4e in the thickness direction of the positioning insertion portion 4e.

In FIG. 1, a position of the hole 6 formed in the first connection-terminal support portion 1c in a circumferential direction of the base 1 is opposite to a position of the hole 6 formed in the second connection-terminal support portion 1d in the circumferential direction of the base 1. Under a state in which the connection terminals 4U, 4V, and 4W are mounted into the base 1, any one of the connecting-portion front surface 4f-1 and the connecting-portion back surface 4f-2 is selectively placed so as to be brought into full contact with a corresponding one of the conductive plate-side connecting portions 3Uc, 3Vc, and 3Wc.

Figure 3:
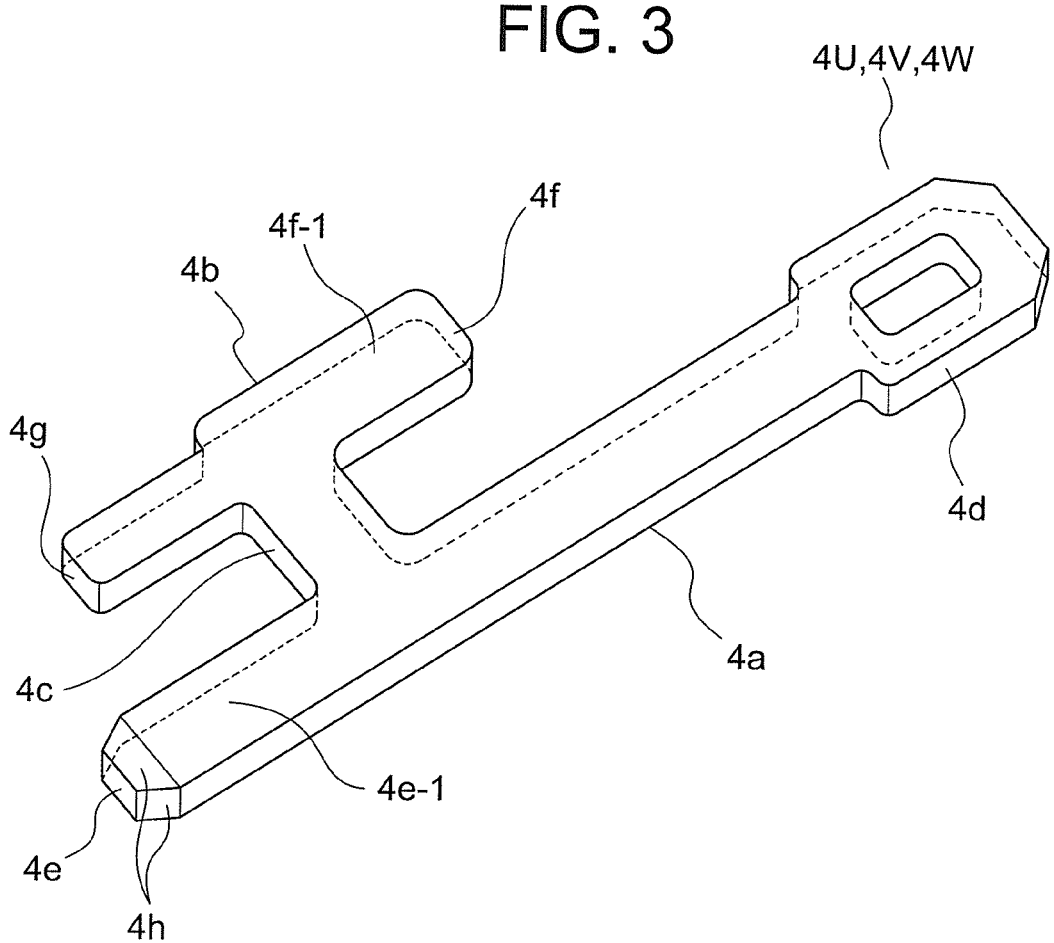
FIG. 3 is a perspective view for illustrating a U-phase connection terminal, a V-phase connection terminal, and a W-phase connection terminal of FIG. 2.

FIG. 3 is a perspective view for illustrating the connection terminal 4U, 4V, 4W of FIG. 2. At both ends of a distal end portion of the positioning insertion portion 4e in a width direction of the positioning insertion portion 4e and both ends thereof in a thickness direction, two sets of inclined surfaces 4h, each having a tapered shape, are formed so that a width dimension and a thickness dimension of each thereof are gradually reduced toward the distal end of the positioning insertion portion 4e.

Next, a method of manufacturing the terminal device of the first embodiment is described. When the conductive plates 3U, 3V, and 3W and the connection terminals 4U, 4V, and 4W are manufactured, conductive flat plates are press-worked into a shape of the conductive plate 3U, 3V, 3W and a shape of the connection terminals 4U, 4V, 4W. For example, when the connection terminal 4U, 4V, 4W is manufactured, as illustrated in FIG. 4, a conductive flat plate, for example, a copper plate 7 is press-worked, specifically, is subjected to shearing to form an intermediate body 7a.

Figure 4:
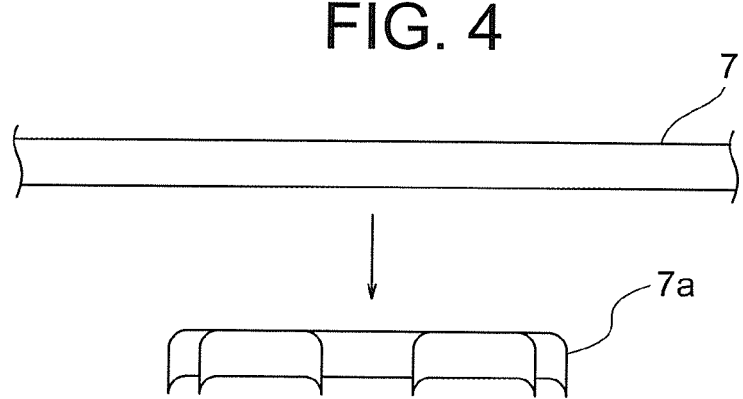
FIG. 4 is an explanatory view for illustrating a method of manufacturing the U-phase connection terminal, the V-phase connection terminal, and the W-phase connection terminal of FIG. 2.

The intermediate body 7a of FIG. 4 is formed by cutting the copper plate 7 downward from a upper side of FIG. 4. As a result, upper corners of the intermediate body 7a are rounded due to so-called "shear droop". At lower corners of the intermediate body 7a, so-called "burr" is formed. Under a state in which the shear droop and the burr described above are formed, a front surface and a back surface of the intermediate body 7a are different from each other.

In particular, when a surface of the terminal-side connecting portion 4f, on which the burr is formed, is brought into full contact with the conductive plate-side connecting portion 3Uc, 3Vc, 3Wc while protrusions formed due to the burr remain, a gap is defined therebetween.

Figure 5:
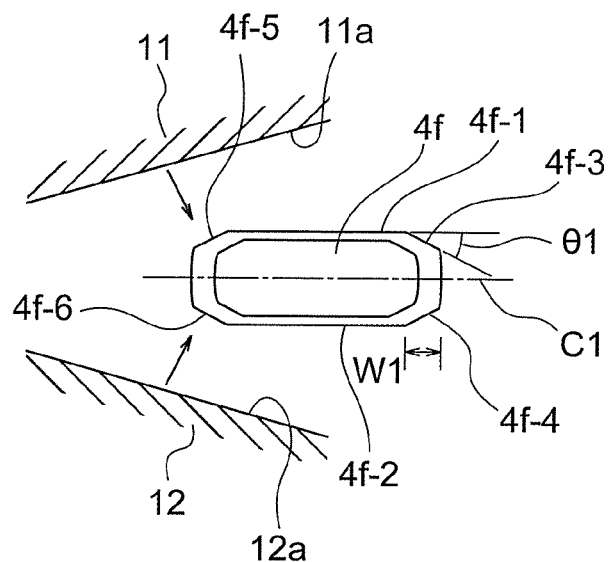
FIG. 5 is an explanatory view for illustrating a state in which compression processing is performed for a terminal-side connecting portion of an intermediate body of FIG. 4.

Meanwhile, in this embodiment, as illustrated in FIG. 5, compression processing is performed for both ends of the terminal-side connecting portion 4f in the width direction with a first die 11 and a second die 12. The first die 11 has a first compression surface 11a that is inclined with respect to the connecting-portion front surface 4f-1. The second die 12 has a second compression surface 12a that is inclined to the side opposite to the first compression surface 11a with respect to the connecting-portion back surface 4f-2.

Through the compression processing described above, the connecting-portion front surface 4f-1 and the connecting-portion back surface 4f-2 of the terminal-side connecting portion 4f, which serves as a processed connecting portion, gradually approach each other as extending outward in a width direction of the terminal-side connecting portion 4f at both ends of the terminal-side connecting portion 4f in the width direction.

Specifically, at one end of the terminal-side connecting portion 4f in the width direction, a pair of inclined surfaces 4f-3 and 4f-4, each having a tapered shape, is formed. At another end of the terminal-side connecting portion 4f in the width direction, a pair of inclined surfaces 4f-5 and 4f-6, each having a tapered shape, is formed.

The inclined surface 4f-3 and the inclined surface 4f-4 are line-symmetric with respect to a center line C1 in the thickness direction of the terminal-side connecting portion 4f. The inclined surface 4f-5 and the inclined surface 4f-6 are line-symmetric with respect to the center line C1 in the thickness direction of the terminal-side connecting portion 4f.

Figure 6:
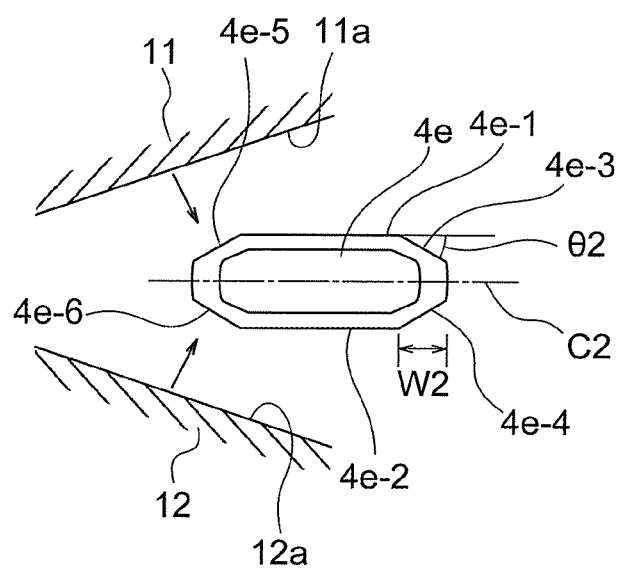
FIG. 6 is an explanatory view for illustrating a state in which compression processing is performed for a positioning insertion portion of the intermediate body of FIG. 4.

Further, as illustrated in FIG. 6, similar compression processing is also performed for the positioning insertion portion 4e. Through the compression processing described above, the insertion-portion front surface 4e-1 and the insertion-portion back surface 4e-2 of the positioning insertion portion 4e gradually approach each other as extending outward in a width direction of the positioning insertion portion 4e at both ends of the positioning insertion portion 4e in the width direction.

Specifically, at one end of the positioning insertion portion 4e in the width direction, a pair of inclined surfaces 4e-3 and 4e-4, each having a tapered shape, is formed. At another end of the positioning insertion portion 4e in the width direction, a pair of inclined surfaces 4e-5 and 4e-6, each having a tapered shape, is formed.

The inclined surface 4e-3 and the inclined surface 4e-4 are line-symmetric with respect to a center line C2 in the thickness direction of the positioning insertion portion 4e. The inclined surface 4e-5 and the inclined surface 4e-6 are line-symmetric with respect to the center line C2 in the thickness direction of the positioning insertion portion 4e.

An inclination angle θ2 and an inclination range W2 of each of the insertion-portion front surface 4e-1 and the insertion-portion back surface 4e-2 at both ends of the positioning insertion portion 4e illustrated in FIG. 6 in the width direction are larger than an inclination angle θ1 and an inclination range W1 of each of the connecting-portion front surface 4f-1 and the connecting-portion back surface 4f-2 at both ends of the terminal-side connecting portion 4f illustrated in FIG. 5 in the width direction, respectively. The inclination angles θ1 and θ2 formed through the compression processing can be appropriately changed.

The inclined surfaces 4h of the positioning insertion portion 4e in the width direction can be formed through press-working. The inclined surfaces 4h of the positioning insertion portion 4e in the thickness direction can be formed through the compression processing.

As described above, after the terminal-side connecting portion 4f and the positioning insertion portion 4e are formed through the press-working, the compression processing is performed for both surfaces at both ends of the terminal-side connecting portion 4f in the width direction and both surfaces at both ends of the positioning insertion portion 4e in the width direction. As a result, the shear droop and the burr formed in the press-working are removed to thereby form the connection terminals 4U, 4V, and 4W.

Even for the conductive plates 3U, 3V, and 3W, the compression processing can be partially performed as needed. After the conductive plates 3U, 3V, and 3W and the connection terminals 4U, 4V, and 4W are formed, the conductive plates 3U, 3V, and 3W are assembled into the base 1 and the connection terminals 4U, 4V, and 4W are mounted into the connection-terminal support portions 1c, 1d, and 1e, respectively. Then, the terminal-side connecting portions 4f are connected to corresponding ones of the conductive plate-side connecting portions 3Uc, 3Vc, and 3Wc, respectively, to thereby manufacture the terminal device.

With the terminal device for a rotary electric machine and the method of manufacturing the terminal device described above, the compression processing, specifically, edge-rounding is performed for both surfaces, specifically, the connecting-portion front surface 4f-1 and the connecting-portion back surface 4f-2. Thus, the connection terminals 4U, 4V, and 4W can be connected to the conductive plates 3U, 3V, and 3W without formation of the shear droop and the burr and need for checking the front side and the back side. Thus, manufacturing efficiency can be improved.

For example, when an effective space cannot be ensured between the terminal-side connecting portion 4f and the arm portion 3Ub, 3Vb, 3Wb because of a positional relationship between the connection terminals 4U, 4V, and 4W and the arm portions 3Ub, 3Vb, and 3Wb, the terminal device is designed so that the connection terminal 4U, 4V, 4W is appropriately turned over. As a result, a sufficient space can be ensured. In this manner, a degree of freedom in design can be improved.

Further, with the use of common components for the connection terminals 4U, 4V, and 4W, the number of kinds of components is reduced. As a result, cost can be reduced.

Further, when the connection terminals 4U, 4V, and 4W are mounted into the base 1 by an assembly device, the U-phase connection terminal 4U and the V-phase connection terminal 4V can be gripped so as to be oriented in the same direction and be inserted into the hole 6 in the first connection-terminal support portion 1c and the hole 6 of the second connection-terminal support portion 1d, respectively. Thus, a mechanism for rotating the connection terminal by 180 degrees is not required to be provided to a gripping portion configured to grip the connection terminals 4U, 4V, and 4W.

Further, each of the connection terminals 4U, 4V, and 4W has the positioning insertion portion 4e, and the holes 6 are formed in the base 1. Thus, the connection terminals 4U, 4V, and 4W can easily be positioned.

Further, similar compression processing to that performed for the terminal-side connecting portions 4f is performed for the positioning insertion portions 4e. Thus, the positioning insertion portions 4e can be smoothly inserted into the holes 6 without being caught. As a result, the connection terminals 4U, 4V, and 4W can be more accurately positioned.

Further, the inclination angle θ2 and the inclination range W2 of each of the insertion-portion front surface 4e-1 and the insertion-portion back surface 4e-2 at both ends of the positioning insertion portion 4e in the width direction are larger than the inclination angle θ1 and the inclination range W1 of each of the connecting-portion front surface 4f-1 and the connecting-portion back surface 4f-2 at both ends of the terminal-side connecting portion 4f in the width direction, respectively. Thus, the positioning insertion portions 4e can be more smoothly inserted into the holes 6. Further, a joint area of the terminal-side connecting portion 4f to the conductive plate-side connecting portion 3Uc, 3Vc, 3Wc can be sufficiently ensured.

Further, the two sets of inclined surfaces 4h, each having a tapered shape, are formed at the distal end portion of each of the positioning insertion portions 4e. Thus, the positioning insertion portions 4e can be more smoothly inserted into the holes 6.

Further, the terminal-side connecting portion 4f is non-linearly continuous with the current supply portion 4d through intermediation of the bridge portion 4c. Thus, even when the terminal-side connecting portion 4f is connected to the conductive plate-side connecting portion 3Uc, 3Vc, 3Wc through, for example, welding, thermal conduction to the current supply portion 4d can be suppressed. Accordingly, even when an electric component is connected in advance to the current supply portion 4d, thermal conduction to the electric component can be suppressed.

Further, the connection terminal 4U, 4V, 4W has the abutment portion 4g. Thus, tilt of the connection terminal 4U, 4V, 4W can be prevented. At the same time, the terminal-side connecting portions 4f can easily be positioned in a direction of inserting the positioning insertion portions 4e into the holes 6.

In the example described above, the compression processing is performed for the terminal-side connecting portions 4f and the positioning insertion portions 4e. However, the compression processing for the positioning insertion portions 4e may be omitted. Further, the compression processing may also be performed for the current supply portions 4d depending on a connection direction. There arises no problem even when the burr and the shear droop are present on other portion of the connection terminal 4U, 4V, 4W. Thus, the compression processing is not required to be performed.

In the example described above, the inclined surfaces, each being a flat surface, are formed through the compression processing. However, each of the inclined surfaces may be formed as a curved surface having roundness.

In the example described above, the compression processing is performed for both surfaces of each of the terminal-side connecting portions 4f. However, the compression processing may be performed for both surfaces of each of the conductive plate-side connecting portions 3Uc, 3Vc, and 3Wc to which the terminal-side connecting portions 4f are connected. Further, the compression processing may be performed only for the conductive plate-side connecting portions 3Uc, 3Vc, and 3Wc. As compared to a case in which the compression processing is performed for none of the terminal-side connecting portions 4f and the conductive plate-side connecting portions 3Uc, 3Vc, and 3Wc, the effects of the present invention can be obtained. Specifically, the processed connecting portion is at least any one of the first connecting portion and the second connecting portion.

Still further, in the example described above, the motor has been described as the rotary electric machine. However, the present invention is applicable also to, for example, a terminal device for a power generator or a motor generator.

REFERENCE SIGNS LIST 1 base, 3U U-phase conductive plate (conductive member), 3Uc U-phase conductive plate-side connecting portion (first connecting portion), 3V V-phase conductive plate (conductive member), 3Vc V-phase conductive plate-side connecting portion (first connecting portion), 3W W-phase conductive plate (conductive member), 3Wc W-phase conductive plate-side connecting portion (first connecting portion), 4U U-phase connection terminal, 4V V-phase connection terminal, 4W W-phase connection terminal, 4c bridge portion, 4d current supply portion, 4e positioning insertion portion, 4e-1 insertion-portion front surface, 4e-2 insertion-portion back surface, 4f terminal-side connecting portion (second connecting portion), 4f-1 connecting-portion front surface, 4f-2 connecting-portion back surface, 4h inclined surface, 6 hole

The invention claimed is:
1. A terminal device for a rotary electric machine, comprising:
   a base made of an insulating material;
   a plurality of conductive members provided to the base, each of the plurality of conductive members comprising a first connecting portion having a flat plate shape; and
   connection terminals, each having a second connecting portion having a flat plate shape, the second connecting portion to be connected to a corresponding one of the first connecting portions,
   wherein each of the first connecting portion and the second connecting portion has a connecting-portion front surface and a connecting-portion back surface being positioned on a back side of the connecting-portion front surface,
   wherein each of the connecting-portion front surface and the connecting-portion back surface of each of the second connecting portions is selectively brought into full contact with the corresponding one of the first connecting portions, and
   wherein the connecting-portion front surface and the connecting-portion back surface of a processed connecting portion being at least any one of the first connecting portions and the second connecting portions gradually approach each other as extending outward in a width direction of the processed connecting portion at both ends of the processed connecting portion that are disposed in the width direction of the processed connecting portion,
   wherein the base has a plurality of holes,
   wherein each of the connection terminals further has a positioning insertion portion to be inserted into a corresponding one of the plurality of holes,
   wherein the second connecting portions are respectively brought into full contact with the first connecting portions through insertion of the positioning insertion portions into the plurality of holes, respectively,
   wherein each of the positioning insertion portions has an insertion-portion front surface and an insertion-portion back surface being positioned on a back side of the insertion-portion front surface,
   wherein the insertion-portion front surface and the insertion-portion back surface of each of the positioning insertion portions gradually approach each other as extending outward in a width direction of the positioning insertion portion at both ends of the positioning insertion portion in the width direction of the positioning insertion portion,
   wherein each of the connecting-portion front surface and the connecting-portion back surface is inclined in a tapered manner at both ends of the processed connecting portion in the width direction of the processed connecting portion, and each of the insertion-portion front surface and the insertion-portion back surface is inclined in a tapered manner at both ends of the positioning insertion portion in the width direction, and
   wherein an inclination angle of each of the connecting-portion front surface and the connecting-portion back surface at the both ends of the processed connecting portion in the width direction is different from an inclination angle of each of the insertion-portion front surface and the insertion-portion back surface at the both ends of the positioning insertion portion in the width direction.

2. The terminal device for a rotary electric machine according to claim 1, wherein the inclination angle and an inclination range of each of the insertion-portion front surface and the insertion-portion back surface at the both ends of the positioning insertion portion in the width direction are larger than the inclination angle and an inclination range of each of the connecting-portion front surface and the connecting-portion back surface at the both ends of the processed connecting portion in the width direction, respectively.

3. The terminal device for a rotary electric machine according to claim 2, wherein two sets of inclined surfaces, each having a tapered shape, are formed at a distal end portion of each of the positioning insertion portions so that a width dimension and a thickness dimension of each of the inclined surfaces gradually decrease in a direction toward the distal end portion of a corresponding one of the positioning insertion portions.

4. The terminal device for a rotary electric machine according to claim 2,
   wherein each of the connection terminals further has a current supply portion, and
   wherein each of the second connecting portions is non-linearly continuous with a corresponding one of the current supply portions.

5. The terminal device for a rotary electric machine according to claim 1, wherein two sets of inclined surfaces, each having a tapered shape, are formed at a distal end portion of each of the positioning insertion portions so that a width dimension and a thickness dimension of each of the inclined surfaces gradually decrease in a direction toward the distal end portion of a corresponding one of the positioning insertion portions.

6. The terminal device for a rotary electric machine according to claim 5,
   wherein each of the connection terminals further has a current supply portion, and
   wherein each of the second connecting portions is non-linearly continuous with a corresponding one of the current supply portions.

7. The terminal device for a rotary electric machine according to claim 1,
   wherein each of the connection terminals further has a current supply portion, and
   wherein each of the second connecting portions is non-linearly continuous with a corresponding one of the current supply portions.

\* \* \* \* \*